Dec. 5, 1961 C. J. WOOLHOUSE 3,012,125
APPARATUS FOR LOOSENING SOLID CONTENT OF CUPS
Filed Aug. 25, 1959

INVENTOR.
Charles J. Woolhouse
BY
Roberts, Cushman & Grover
ATT'YS

United States Patent Office 3,012,125
Patented Dec. 5, 1961

3,012,125
APPARATUS FOR LOOSENING SOLID CONTENT OF CUPS
Charles J. Woolhouse, Framingham, Mass., assignor, by mesne assignments, to Interlux Corporation, Boston, Mass., a corporation of Massachusetts
Filed Aug. 25, 1959, Ser. No. 835,872
3 Claims. (Cl. 219—19)

It is often desirable to loosen the solid content of cups without liquifying the content. For example in dispensing ice cream in paper cups, in restaurants, soda fountains and the like, it is often desirable to transfer the ice cream from the cup to a saucer before serving the ice cream, and with the ice cream frozen to the cup this is ordinarily a difficult operation.

Objects of the present invention are to provide apparatus which will quickly and easily loosen the content of the cup without melting a substantial amount of the content, which is simple and economical in construction, which consumes very little heating current, and which is facile and safe in operation.

According to the present invention the apparatus comprises a heating chamber having an opening large enough to receive the major portion of a cup, together with an electric heater for heating the chamber, a circuit for energizing the heater, a normally-open switch in the circuit and means adjacent the aforesaid opening for holding the switch closed while the cup is held in the opening. Preferably the opening faces downwardly to receive the cup in inverted position so that the cup may be removed by gravity. The switch-closing means preferably comprises an arm overlapping the cup opening to engage the lip of the cup or, in case the cup has no lip, to engage the side of the cup near its mouth. In the preferred embodiment the heating chamber has the cup opening facing downwardly and, in the top of the chamber, a heater opening in which the heater is mounted, with a reflecting surface in the chamber for directing heat from the heater to the cup.

For the purpose of illustration a typical embodiment is shown in the accompanying drawings in which.

Figure 1:
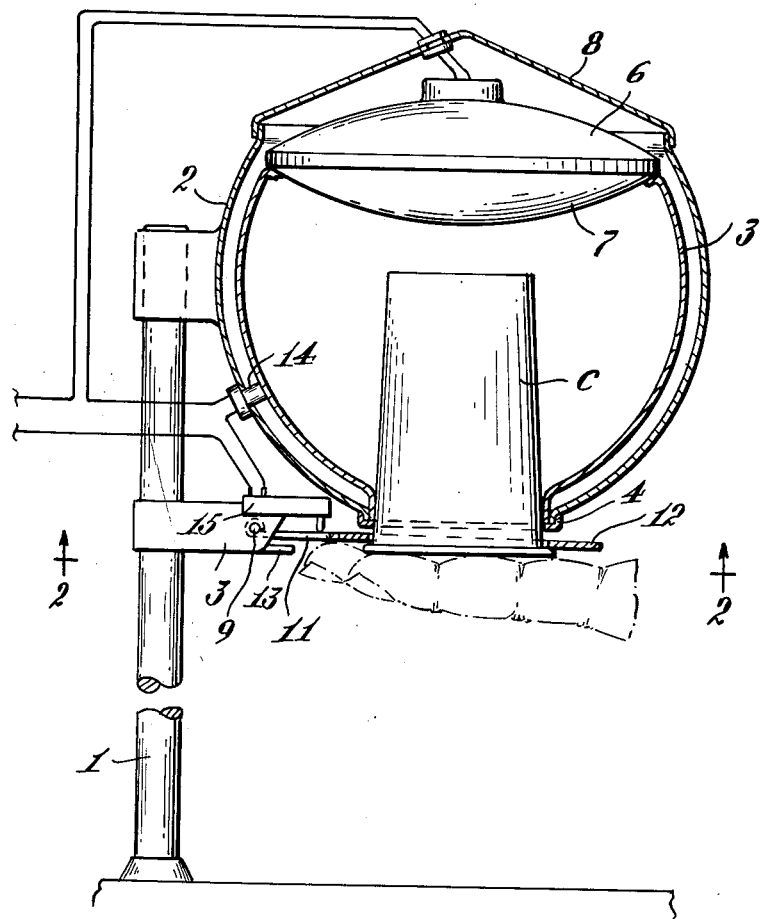
FIG. 1 is a side elevation with parts shown in section.
Figure 2:
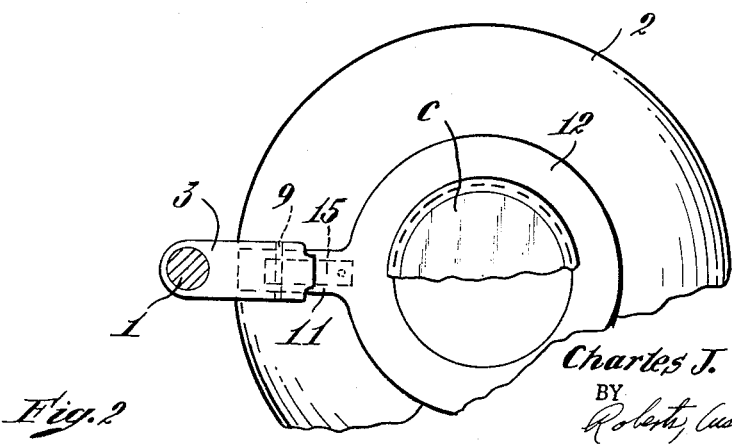
FIG. 2 is a bottom view with parts broken away.

The particular embodiment chosen for the purpose of illustration comprises a standard 1 on which is mounted a spherical chamber 2 and a bracket 3. Inside the chamber 2 is a spherical reflector 3. The spherical parts have coaxial cup openings at the bottom and coaxial heater openings at the top. Surrounding the cup openings are telescoping flanges and fitting over the flanges is a ring 4 for holding the parts together. Mounted in the top opening of the reflector 3 is an ordinary infra-red heater 6 having a glass cover 7. Fitting over the top opening of the chamber 2 is a removable cap 8.

Pivotally mounted on the bracket 3 at 9 is an arm 11 terminating in a ring 12. Disposed beneath the arm 11 is a stop 13 to limit the extent to which the arm can swing away from the cup opening. Mounted on the upper side of the bracket 3 is a microswitch 15 and mounted in the side of the chamber 2 is a thermostatic switch 14, the two switches being connected in series with the heater 6. The switch 15 is closed by movement of the arm from the stop 13 to the position shown in FIG. 1 and switch 14 opens before the chamber 2 becomes hot enough to burn the operator.

The cup opening in the bottom of the heating compartment may fit a cup C snugly so that the cup wedges in the position shown in FIG. 1, but it is preferably somewhat larger than the cup so that the cup must be held up by hand. For use with cups having lips the opening in the ring 12 should be larger than the maximum diameter of the cup but preferably smaller than the outer diameter of the lip so as to be raised to operative position when the cup is inserted as shown in FIG. 1. For use with cups having no lips, the internal diameter of the ring 12 may be slightly less than the maximum diameter of the cup so that the arm 11 is lifted by engagement between the ring 12 and the side of the cup near its mouth, but the arm may be lifted by direct engagement with the hand. After the cup has been held in the position shown in FIG. 1 for a few seconds the content is loosened sufficiently to slide out of the cup easily.

It should be understood that the present disclosure is for the purpose of illustration only and that this invention includes all modifications and equivalents which fall within the scope of the appended claims.

I claim:

1. For loosening the solid content of a cup, apparatus comprising a heating chamber having in its lower side an opening large enough to receive a cup in inverted position, an electric heater for heating the chamber, a circuit for energizing the heater, a normally open switch in the circuit, means for supporting the chamber above a free space through which a cup may be inserted into said opening by hand, and an actuator adjacent the opening for holding the switch closed, whereby the cup may be held in the opening and the switch held closed with one hand, thereby to loosen the content of the cup and permit it to slide out.

2. Apparatus according to claim 1 wherein said actuator is engageable with the cup.

3. Apparatus according to claim 1 wherein said actuator is engageable with the hand holding the cup.

References Cited in the file of this patent

UNITED STATES PATENTS

| | | |
|---|---|---|
| 1,297,031 | Stable | Mar. 11, 1919 |
| 2,041,542 | Gribble | May 19, 1936 |
| 2,086,066 | Churchill | July 6, 1937 |
| 2,115,944 | DeWitt | May 3, 1938 |
| 2,445,120 | Levinson et al. | July 13, 1948 |
| 2,611,068 | Wellens | Sept. 16, 1952 |
| 2,729,733 | Heron | Jan. 3, 1956 |
| 2,738,410 | Ness et al. | Mar. 13, 1956 |
| 2,767,297 | Benson | Oct. 16, 1956 |

FOREIGN PATENTS

| | | |
|---|---|---|
| 909,636 | France | Jan. 4, 1946 |